United States Patent
Ng et al.

(10) Patent No.: US 11,522,571 B2
(45) Date of Patent: Dec. 6, 2022

(54) MOBILE DEVICE CASE WITH BONDED SOFT RESIN INSERT AND SHELL

(71) Applicant: Speculative Product Design, LLC, San Mateo, CA (US)

(72) Inventors: Alan Yu Tung Ng, San Francisco, CA (US); Monica Elizabeth Wright, Falls Church, VA (US); Darrick Del Moral, San Bruno, CA (US); Bryan Lee Hynecek, Redwood City, CA (US); David Kroft Mondry, Aspen, CO (US); Harlan Seth Dannenberg, San Francisco, CA (US); Christopher William Ledesma, Arcadia, CA (US); Ben Walker Hunt, San Francisco, CA (US)

(73) Assignee: Speculative Product Design, LLC, San Mateo, CA (US)

( * ) Notice: Subject to any disclaimer, the term of this patent is extended or adjusted under 35 U.S.C. 154(b) by 0 days.

(21) Appl. No.: 17/081,448

(22) Filed: Oct. 27, 2020

(65) Prior Publication Data
US 2021/0126666 A1    Apr. 29, 2021

Related U.S. Application Data

(60) Provisional application No. 62/926,981, filed on Oct. 28, 2019.

(51) Int. Cl.
*H04B 1/3888*    (2015.01)
(52) U.S. Cl.
CPC .................. *H04B 1/3888* (2013.01)
(58) Field of Classification Search
CPC ... H04B 1/3888; G06F 1/1656; G06F 1/1626; H04M 1/185; A45C 2011/002; A45C 2011/003; A45C 11/00
See application file for complete search history.

(56) References Cited

U.S. PATENT DOCUMENTS 5,265,720 A    11/1993    Meliconi
5,816,459 A    10/1998    Armistead
(Continued)

FOREIGN PATENT DOCUMENTS

CN    1306700 C    3/2007
CN    102525076 A    7/2012
(Continued)

OTHER PUBLICATIONS

CandyShell Grip iPhone 6s Plus Case, posted at speckproducts.com, posting date not given, [online], [site visited Jul. 21, 2017]. Available from Internet, URL: http://www.speckproducts.com/apple/iphonecases/iphone6pluscases/candyshellgripiphone6pluscases/IP6PCSGRIP.html, 7 pages.
(Continued)

*Primary Examiner* — Yuwen Pan
*Assistant Examiner* — Fatuma G Sherif

(57) ABSTRACT

A case for a mobile device includes a frame and an elastomeric shell. The elastomeric shell is received in the frame and has an outer surface, an inner surface opposite the outer surface and configured for receiving the mobile device, and a rim extending between the outer surface and the inner surface. The inner surface forms inner projections each having an inner extremity extending toward an inside of the elastomeric shell and each being configured for contact with the mobile device when arranged in the inner surface. The outer surface forms outer projections defining respective outer projection extremities and forms outer troughs extending between the outer projections and defining outer trough extremities. The outer projections extend toward a frame inner perimeter of the frame such that each of the outer trough extremities is spaced further from the frame than adjacent ones of the outer projection extremities.

15 Claims, 12 Drawing Sheets

(56) References Cited

U.S. PATENT DOCUMENTS

| | | |
|---|---|---|
| 5,908,114 A | 6/1999 | Althouse et al. |
| 6,079,563 A | 6/2000 | Katchmazenski |
| 6,109,434 A | 8/2000 | Howard, Jr. |
| 6,179,122 B1 | 1/2001 | Moncrief et al. |
| 6,273,252 B1 | 8/2001 | Mitchell |
| 6,471,056 B1 | 10/2002 | Tzeng |
| 6,614,722 B2 | 9/2003 | Polany et al. |
| 6,665,174 B1 | 12/2003 | Derr et al. |
| 6,719,381 B2 | 4/2004 | Cleereman et al. |
| 6,785,566 B1 | 8/2004 | Irizarry |
| 6,914,774 B1 | 7/2005 | Albertini et al. |
| 6,926,856 B2 | 8/2005 | Hus et al. |
| 6,980,777 B2 | 12/2005 | Shepherd et al. |
| 6,981,589 B2 | 1/2006 | Sanders, Jr. |
| 7,093,717 B2 | 8/2006 | Sakai et al. |
| 7,248,904 B2 | 7/2007 | Gartrell et al. |
| 7,343,184 B2 | 3/2008 | Rostami |
| 7,495,895 B2 | 2/2009 | Carnevali |
| D587,896 S | 3/2009 | Aipa |
| D593,319 S | 6/2009 | Richardson et al. |
| D593,746 S | 6/2009 | Richardson et al. |
| 7,551,949 B2 | 6/2009 | Schworm |
| 7,609,512 B2 | 10/2009 | Richardson et al. |
| 7,623,898 B2 | 11/2009 | Holmberg |
| 7,647,082 B2 | 1/2010 | Holmberg |
| D610,807 S | 3/2010 | Bau |
| D617,784 S | 6/2010 | Richardson et al. |
| 7,907,394 B2 | 3/2011 | Richardson et al. |
| D638,007 S | 5/2011 | Chang |
| 8,026,693 B2 | 9/2011 | Burley |
| D646,264 S | 10/2011 | Dong |
| D647,517 S | 10/2011 | Fathollahi |
| D650,776 S | 12/2011 | Bau |
| 8,073,131 B2 | 12/2011 | Bodkin et al. |
| D652,825 S | 1/2012 | Bau |
| D659,691 S | 5/2012 | Kim et al. |
| D662,929 S | 7/2012 | Fahrendorff et al. |
| 8,245,842 B2 | 8/2012 | Bau |
| D669,458 S | 10/2012 | Wilson et al. |
| D670,912 S | 11/2012 | Bau |
| D671,930 S | 12/2012 | Akana et al. |
| D674,789 S | 1/2013 | Wen |
| D679,695 S | 4/2013 | Fahrendorff et al. |
| 8,490,783 B1 | 7/2013 | Fan |
| D688,233 S | 8/2013 | Dong |
| 8,579,112 B2 | 11/2013 | Bethea |
| D696,238 S | 12/2013 | Murchison et al. |
| D696,240 S | 12/2013 | Kim et al. |
| 8,596,449 B2 | 12/2013 | Mongan et al. |
| 8,655,422 B2 | 2/2014 | Stiehl et al. |
| 8,706,176 B1 | 4/2014 | Jia et al. |
| 8,708,140 B2 | 4/2014 | Liu |
| 8,718,731 B1 | 5/2014 | Tang |
| D706,255 S | 6/2014 | Akana et al. |
| D707,215 S | 6/2014 | Weller et al. |
| D707,670 S | 6/2014 | Chang et al. |
| 8,755,852 B2 | 6/2014 | Hynecek et al. |
| 8,770,402 B2 | 7/2014 | Bergreen et al. |
| 8,774,882 B2 | 7/2014 | Tages et al. |
| D716,281 S | 10/2014 | Melanson et al. |
| D716,282 S | 10/2014 | Melanson et al. |
| D716,284 S | 10/2014 | Melanson et al. |
| D716,783 S | 11/2014 | Loncar et al. |
| D717,779 S | 11/2014 | Dong |
| 8,887,903 B2 | 11/2014 | Diebel et al. |
| D718,756 S | 12/2014 | Barfoot et al. |
| D719,559 S | 12/2014 | Dukerschein et al. |
| D720,735 S | 1/2015 | Furocy |
| D721,360 S | 1/2015 | Laffon de Mazieres et al. |
| D721,687 S | 1/2015 | To et al. |
| D724,067 S | 3/2015 | Fathollahi |
| D725,091 S | 3/2015 | Wen |
| D726,170 S | 4/2015 | Ng |
| D728,468 S | 5/2015 | Ferber et al. |
| D729,252 S | 5/2015 | Smith et al. |
| D729,255 S | 5/2015 | Kilkenny |
| 9,056,696 B1 | 6/2015 | Reyes |
| 9,060,580 B2 | 6/2015 | Tages |
| 9,098,238 B2 | 8/2015 | Richardson et al. |
| D740,798 S | 10/2015 | Poon et al. |
| 9,176,532 B2 | 11/2015 | Tages et al. |
| D746,801 S | 1/2016 | Pan |
| D747,707 S | 1/2016 | Roberts et al. |
| D747,708 S | 1/2016 | Roberts et al. |
| 9,264,089 B2 | 2/2016 | Tages |
| D753,641 S | 4/2016 | Roberts et al. |
| D754,651 S | 4/2016 | Roberts et al. |
| D754,652 S | 4/2016 | Roberts et al. |
| D756,344 S | 5/2016 | Roberts et al. |
| D756,345 S | 5/2016 | Roberts et al. |
| D756,977 S | 5/2016 | Schriefer et al. |
| D756,978 S | 5/2016 | Addonisio |
| D757,702 S | 5/2016 | Kanazawa |
| D757,703 S | 5/2016 | Kanazawa |
| D757,704 S | 5/2016 | Roberts et al. |
| D762,200 S | 7/2016 | Pan et al. |
| D762,201 S | 7/2016 | Tseng et al. |
| D762,202 S | 7/2016 | Tseng et al. |
| D763,840 S | 8/2016 | Hwang |
| D763,841 S | 8/2016 | Kim |
| D769,233 S | 10/2016 | Qian et al. |
| D771,607 S | 11/2016 | Kim |
| D772,854 S | 11/2016 | Igarashi |
| 9,526,320 B2 | 12/2016 | Roberts et al. |
| D775,615 S | 1/2017 | Tien |
| D776,100 S | 1/2017 | Igarashi |
| D776,645 S | 1/2017 | Del Moral et al. |
| D777,715 S | 1/2017 | Sawaya |
| 9,545,140 B1 | 1/2017 | Johnson et al. |
| D778,271 S | 2/2017 | Stump et al. |
| D779,470 S | 2/2017 | Kim et al. |
| D780,738 S | 3/2017 | Barfoot et al. |
| 9,615,476 B2 | 4/2017 | Rayner et al. |
| D786,232 S | 5/2017 | Kim et al. |
| D789,344 S | 6/2017 | Kim |
| 9,720,442 B2 | 8/2017 | Mongan et al. |
| D805,064 S | 12/2017 | Lee et al. |
| 9,866,255 B1 | 1/2018 | Ketter-Muldrow |
| 9,872,546 B2 | 1/2018 | Kim |
| D812,600 S | 3/2018 | Altaras |
| D812,619 S | 3/2018 | Altaras |
| D814,453 S | 4/2018 | Chiang et al. |
| D816,551 S | 5/2018 | Leyrikh |
| D816,651 S | 5/2018 | Chiang et al. |
| 10,027,783 B2 | 7/2018 | Dukerschein et al. |
| 10,362,846 B2 | 7/2019 | Denike et al. |
| 10,426,238 B2 | 10/2019 | Kim |
| 10,441,044 B2 | 10/2019 | Chiang et al. |
| D889,451 S | 7/2020 | Chiang et al. |
| 2001/0002003 A1 | 5/2001 | Kuzdak et al. |
| 2003/0036362 A1 | 2/2003 | Buesseler et al. |
| 2003/0068035 A1 | 4/2003 | Pirila et al. |
| 2003/0070959 A1 | 4/2003 | Maresh et al. |
| 2003/0083094 A1 | 5/2003 | Hsu et al. |
| 2003/0103624 A1 | 6/2003 | Hu |
| 2003/0111366 A1 | 6/2003 | Enners |
| 2003/0150756 A1 | 8/2003 | Kajiya |
| 2004/0014506 A1 | 1/2004 | Kemppinen |
| 2004/0154941 A1 | 8/2004 | Montler |
| 2005/0054395 A1 | 3/2005 | Arbisi et al. |
| 2005/0139498 A1 | 6/2005 | Goros |
| 2005/0153757 A1 | 7/2005 | Maenpaa et al. |
| 2005/0174727 A1 | 8/2005 | Thomas et al. |
| 2005/0279661 A1 | 12/2005 | Hodges |
| 2006/0040550 A1 | 2/2006 | Slauson |
| 2006/0164800 A1 | 7/2006 | McEwan et al. |
| 2006/0289030 A1 | 12/2006 | Pho |
| 2007/0060224 A1 | 3/2007 | Liu |
| 2007/0103110 A1 | 5/2007 | Sagoo |
| 2007/0139873 A1 | 6/2007 | Thomas et al. |
| 2007/0182367 A1 | 8/2007 | Partovi |
| 2007/0184781 A1 | 8/2007 | Huskinson |
| 2007/0225031 A1 | 9/2007 | Bodkin et al. |
| 2008/0032758 A1 | 2/2008 | Rostami |

(56) References Cited

U.S. PATENT DOCUMENTS

| | | |
|---|---|---|
| 2008/0039161 A1 | 2/2008 | Chan |
| 2008/0096620 A1 | 4/2008 | Lee et al. |
| 2008/0227507 A1 | 9/2008 | Joo |
| 2008/0242384 A1 | 10/2008 | Hsu et al. |
| 2009/0080153 A1 | 3/2009 | Richardson et al. |
| 2009/0107661 A1 | 4/2009 | Andersson et al. |
| 2009/0111543 A1 | 4/2009 | Tai et al. |
| 2009/0194444 A1 | 8/2009 | Jones |
| 2010/0006314 A1 | 1/2010 | Wilson, II et al. |
| 2010/0078343 A1 | 4/2010 | Hoellwarth et al. |
| 2010/0096284 A1 | 4/2010 | Bau |
| 2010/0104814 A1 | 4/2010 | Richardson et al. |
| 2010/0116387 A1 | 5/2010 | Channey et al. |
| 2010/0144411 A1 | 6/2010 | Pettingill |
| 2010/0147715 A1 | 6/2010 | Miglioli et al. |
| 2010/0203931 A1 | 8/2010 | Hynecek et al. |
| 2010/0243515 A1 | 9/2010 | Mish et al. |
| 2010/0305662 A1 | 12/2010 | Ozawa et al. |
| 2011/0055447 A1 | 3/2011 | Costa |
| 2012/0008880 A1 | 1/2012 | Toth |
| 2012/0013294 A1 | 1/2012 | Yeh |
| 2012/0043234 A1 | 2/2012 | Westrup |
| 2012/0067751 A1 | 3/2012 | Mongan et al. |
| 2012/0103844 A1 | 5/2012 | Piedra et al. |
| 2012/0261289 A1 | 10/2012 | Wyner et al. |
| 2012/0325720 A1 | 12/2012 | Tages et al. |
| 2013/0001105 A1 | 1/2013 | Mongan et al. |
| 2013/0026981 A1 | 1/2013 | Van Der Lee |
| 2013/0105354 A1 | 5/2013 | Wyner et al. |
| 2013/0175186 A1 | 7/2013 | Simmer |
| 2013/0193006 A1 | 8/2013 | Bergreen et al. |
| 2014/0034531 A1 | 2/2014 | Wang |
| 2014/0069825 A1 | 3/2014 | Macrina et al. |
| 2014/0078671 A1 | 3/2014 | Hong |
| 2014/0116897 A1 | 5/2014 | Wilkey |
| 2014/0274232 A1 | 9/2014 | Tages |
| 2015/0001104 A1 | 1/2015 | Kim |
| 2015/0060309 A1 | 3/2015 | Sartee et al. |
| 2015/0068935 A1 | 3/2015 | Kay et al. |
| 2015/0076187 A1 | 3/2015 | Cohen |
| 2015/0119118 A1 | 4/2015 | Ashley et al. |
| 2015/0129095 A1 | 5/2015 | Marin |
| 2015/0141095 A1 | 5/2015 | Kim |
| 2015/0195929 A1 | 7/2015 | Roberts et al. |
| 2015/0295617 A1* | 10/2015 | Lai ............... H04B 1/3888 455/575.8 |
| 2015/0295618 A1 | 10/2015 | Johnson et al. |
| 2016/0015138 A1* | 1/2016 | Poon ............... H05K 999/99 224/191 |
| 2016/0058146 A1 | 3/2016 | Baker et al. |
| 2016/0094263 A1 | 3/2016 | Fathollahi |
| 2016/0113136 A1 | 4/2016 | Shin et al. |
| 2016/0119013 A1 | 4/2016 | Wojcik et al. |
| 2016/0157573 A1 | 6/2016 | Del Moral et al. |
| 2016/0182114 A1* | 6/2016 | Tien ............... A45C 11/00 224/191 |
| 2016/0295981 A1 | 10/2016 | Lay et al. |
| 2017/0049199 A1 | 2/2017 | Kim |
| 2017/0187853 A1 | 6/2017 | Dukerschein et al. |
| 2017/0188676 A1 | 7/2017 | Denike et al. |
| 2018/0027150 A1* | 1/2018 | Rogers ............... H04N 5/2252 361/679.01 |
| 2018/0289122 A1 | 10/2018 | Lin |
| 2018/0332724 A1 | 11/2018 | Roberts et al. |
| 2018/0332939 A1* | 11/2018 | Chiang ............... A45C 11/00 |
| 2019/0013832 A1 | 1/2019 | Mody et al. |
| 2019/0075899 A1 | 3/2019 | Hynecek et al. |
| 2019/0075900 A1* | 3/2019 | Hynecek ............... A45C 11/00 |
| 2019/0081299 A1* | 3/2019 | Chiang ............... A45C 15/00 |
| 2019/0208878 A1* | 7/2019 | Hynecek ............... H04M 1/04 |

FOREIGN PATENT DOCUMENTS

| | | |
|---|---|---|
| CN | 105472072 A | 4/2016 |
| EP | 2723212 B1 | 2/2019 |
| GB | 2463712 A | 3/2010 |
| KR | 200407284 Y1 | 1/2006 |
| KR | 20080050555 A | 6/2008 |
| KR | 200472205 Y1 | 4/2014 |
| KR | 101422194 B1 | 7/2014 |
| WO | 0211161 A2 | 2/2002 |
| WO | 2007/120254 A2 | 10/2007 |
| WO | 2008032891 A1 | 3/2008 |
| WO | 2009018345 A2 | 2/2009 |
| WO | 2012149304 A1 | 11/2012 |
| WO | 2013129763 A1 | 9/2013 |

OTHER PUBLICATIONS

Chiang et al., U.S. Appl. No. 29/614,281, filed Aug. 17, 2017, titled "Case for an Electronic Device".

European Search Report for EP18193156 dated Jan. 18, 2019.

Extended European Search Report and Written Opinion for EP Application No. 18193164.3, dated Feb. 12, 2019.

Incipio DualPro Case, posted at amazon.com, posting date not given, [online], [site visited Jul. 20, 2017]. Available from Internet,<URL: https://www.amazon.com/iPhoneIncipioDualProShockAbsorbing/dp/B01JPIBZUO>.

Lohasic 3-In-1 Case, posted at amazon.com, posting date not given, [online], [site visited Jul. 20, 2017]. Available from Internet, <URL: https://www.amazon.com/RoybensAntiScratchAntifingerprintShockproofElectroplate/dp/B01LMW06DG>.

OtterBox Symmetry Case, posted at amazon.com, posting date not given, [online], [site visited Jul. 20, 2017]. Available from Internet, <URL: https://www.amazon.com/OtterBoxSYMMETRYCaseiPhoneONL Y/dp/801 K6PB3XG/>.

OtterBox Symmetry Case, posted at amazon.com, posting date not given, [online], [site visited Jul. 20, 2017]. Available from Internet, <URL: https://www.amazon.com/OtterBoxSYMMETRYCaseiPhoneONLY/dp/B01K6PB3XG/>.

Speck iPhone 7 Plus Presidio, posted at amazon.com, posting date Aug. 8, 2016, [online], [site visited Jul. 20, 2017]. Available from Internet, <URL: https://www.amazon.com/SpeckProductsPresidioPhoneiPhone/dp/B01 JRU57Y2>.

Speck Products CandyShell Grip Case, posted at amazon.com, posting date Sep. 20, 2017, [online], [site visited Jul. 21, 2017]. Available from Internet, URL: https://www.amazon.com/SpeckProductsCandyShellGripiPhone/dp/BOOMV77FOA, 10 pages.

Extended European Search Report including Written Opinion for EP20204241.2 dated Mar. 9, 2021; 5 pages.

\* cited by examiner

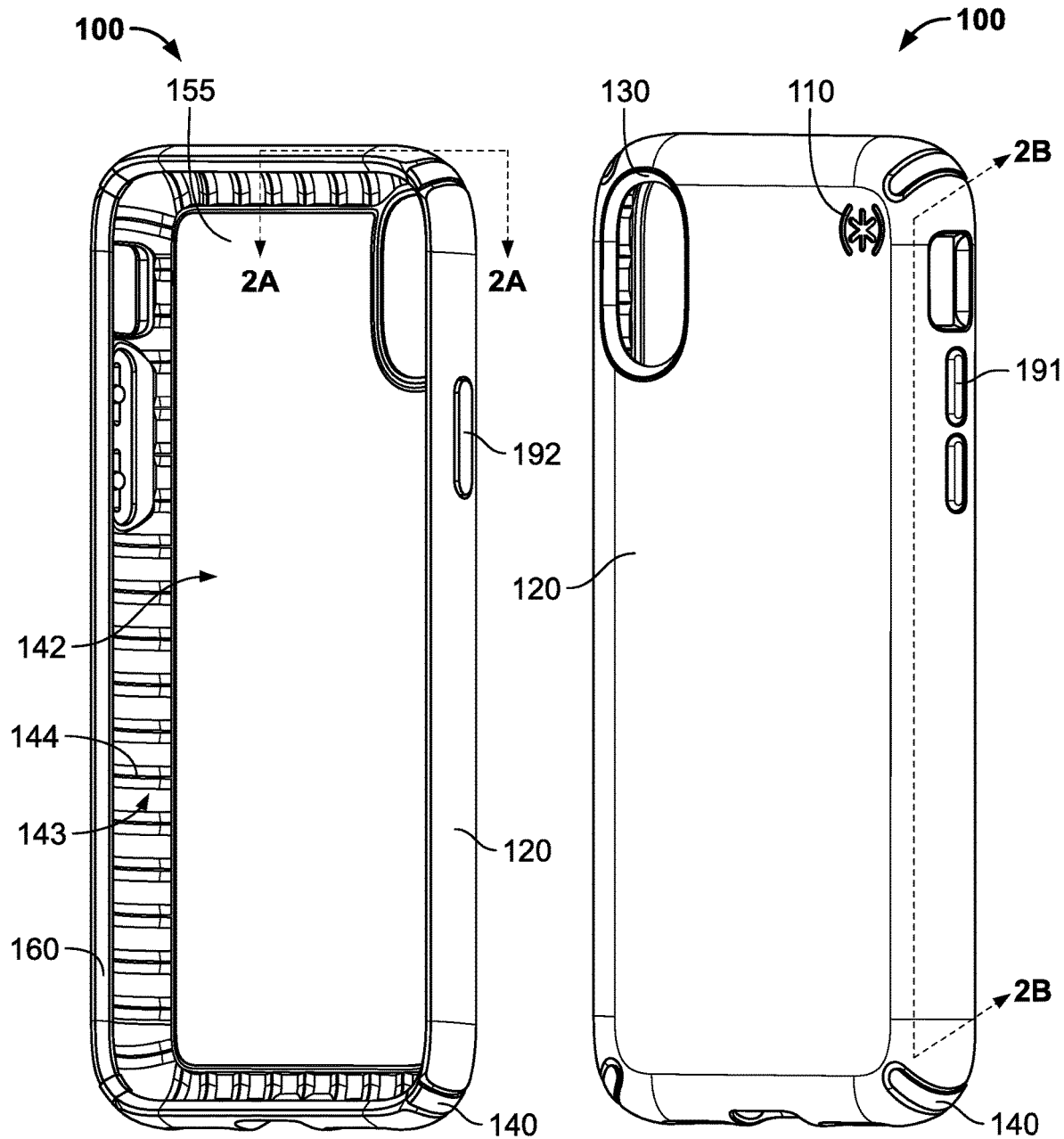
FIG. 1A  FIG. 1B

MOBILE DEVICE CASE WITH BONDED SOFT RESIN INSERT AND SHELL

CROSS-REFERENCE TO RELATED APPLICATION

The present application claims the benefit of the filing date of U.S. Provisional Patent Application No. 62/926,981 filed Oct. 28, 2019, the disclosure of which is hereby incorporated herein by reference.

FIELD OF THE INVENTION

The present application relates generally to mobile device cases, and in particular, multilayer cases providing shock absorption and wear resistance characteristics.

BACKGROUND OF THE INVENTION

Cases for mobile devices, such as mobile phones, tablets, and mobile computers, e.g., laptop computers, have been designed to provide at least some protection from impact events, such as when the device is dropped, hit, or otherwise struck. In order to provide such protection, materials are often employed which noticeably increase the thickness and weight of the case, and thus impact the portability and ease of use of the resultant protected device. One way to improve the impact protection of a case is to increase the amount of material in the case that provides the impact protection. Increasing the amount of material, however, increases the cost of the case and further increases the size and weight of the case. Both of which are undesirable to consumers.

A number of mobile device cases currently on the market utilize flexible polymer shells overmolded onto rigid outer frames to provide shock protection as well as a reduced friction and a favorable feel to consumers. However, only certain materials have sufficient compatibility for overmolding, and thus the thickness and rigidity/flexibility of such cases have been limited by the number and variety of compatible materials. In this manner, many such cases have utilized a combination of polycarbonate as a rigid outer frame and thermoplastic elastomers ("TPE") as the flexible polymer shell. To provide additional shock protection, recent advances in mobile device cases have incorporated shock-absorbing impact geometry in the form of triangular ridges that protrude from the inner surface defined by sides of the case, as disclosed in U.S. Pat. No. 10,441,044, the disclosure of which is hereby incorporated herein by reference.

Still further improvements in shock protection, especially such improvements reducing overall thickness and providing for more customization in the rigidity/flexibility of cases, are desirable.

BRIEF SUMMARY OF THE INVENTION

In accordance with one aspect, a case for removably receiving a separate and distinct mobile device may include a frame and an elastomeric shell. The mobile device may have a front device surface, a rear device surface opposite the front device surface, and a periphery extending between the front device surface and the rear device surface. The frame may define a frame inner perimeter and may be configured for surrounding the periphery of the mobile device when the mobile device is received within the case and may define a frame recess. The elastomeric shell may be received in or may be configured for receipt in the frame recess and may be surrounded by or configured to be surrounded by the frame. The elastomeric shell may have a shell outer surface, a shell inner surface opposite the shell outer surface, and a shell rim that may extend between the shell outer surface and the shell inner surface. The shell inner surface may define a pocket that may be configured for receiving the mobile device. The shell outer surface may form outer projections that may define respective outer projection extremities. The shell outer surface further may form respective outer troughs that may extend between the outer projections and may define outer trough extremities. The outer projections may extend toward the frame inner perimeter such that each of the outer trough extremities may be spaced further from the frame than adjacent ones of the outer projection extremities.

In some arrangements, a thickness of the elastomeric shell along at least a portion of a cross-section of the elastomeric shell that includes one of the outer projections and one of the outer troughs and that lies within a first plane that includes the one of the outer projections and the one of the outer troughs may be uniform.

In some arrangements, the shell inner surface may form inner projections. Each of the inner projections may have an inner extremity that may extend toward an inside of the elastomeric shell and may be configured for contact with the periphery of the mobile device when the mobile device is arranged in the shell inner surface.

In some arrangements, the pocket of the elastomeric shell may be configured to extend substantially around only the periphery of the mobile device such that at least a majority of the front surface of the mobile device and at least a majority of the rear surface of the mobile device are not covered by the elastomeric shell when the mobile device is received in the elastomeric shell.

In some arrangements, the shell inner surface of the elastomeric shell may include an inner bottom surface and inner side surfaces extending from the inner bottom surface. The inner bottom surface and the inner side surfaces may define the pocket of the elastomeric shell such that a substantial portion of the rear device surface of the mobile device is covered by the inner bottom surface when the mobile device is received in the elastomeric shell.

In some arrangements, the outer trough extremities may have a greater thickness at respective first locations of the outer trough extremities closer to the shell rim than at respective second locations that are within a same plane as the respective first locations and are further from the shell rim than the respective first locations.

In some arrangements, the frame may include a frame bezel that may extend over at least a portion of the shell rim.

In some arrangements, opposing portions of the shell rim and the frame bezel may be spaced apart a greater distance than portions of the elastomeric shell adjacent to the shell rim are spaced from opposing portions of the frame to define an adhesive channel. In such arrangements, the case further may include an adhesive extending along the adhesive channel and bonding the frame bezel to the shell rim.

In some arrangements, the frame may include a frame rim. In such arrangements, the elastomeric shell may include a shell bezel that may define the shell rim. The shell bezel may extend over at least a portion of the frame rim.

In some arrangements, opposing portions of the frame rim and the shell bezel may be spaced apart to define an adhesive channel. In such arrangements, the case further may include an adhesive extending along the adhesive channel and bonding the shell bezel to the frame rim.

In some arrangements, the frame may include a frame rim. In such arrangements, the case further may include an elastomeric bezel that may extend from the frame rim and that may extend over at least a portion of the shell rim.

In some arrangements, the frame may include a plurality of frame holes adjacent the frame rim. In such arrangements, portions of the elastomeric bezel may extend through the plurality of frame holes.

In some arrangements, opposing portions of the shell rim and the elastomeric bezel may be spaced apart a greater distance than portions of the elastomeric shell adjacent to the shell rim are spaced from opposing portions of the elastomeric bezel to define an adhesive channel. In such arrangements, the case further may include an adhesive extending along the adhesive channel and bonding the elastomeric bezel to the shell rim.

In some arrangements, the elastomeric bezel may be attached to the frame via overmolding.

In some arrangements, the outer projection extremities may contact the frame when the elastomeric shell is received in the frame without the mobile device being received in the elastomeric shell and without any external forces being applied to the elastomeric shell.

In some arrangements, each of the outer projection extremities may extend to the frame. In some such arrangements, each of the outer projection extremities may thereby contact the frame.

In some arrangements, a tangential plane tangential to at least three of the outer projection extremities may define spaced-apart and collinear segments.

In some arrangements, each of the outer projection extremities may be a flat surface.

In some arrangements, the frame may include a frame inner surface having a frame planar portion. In such arrangements, at least a portion, preferably a majority, and in some such arrangements an entirety, of at least one of the segments defined by the outer projection extremities may lie in abutment with the frame planar portion.

In some arrangements, each of the outer projection extremities may form an apex of each of the respective outer projections.

In some arrangements, either one or both of the frame and the elastomeric shell may be translucent, transparent, or clear.

In some arrangements, the frame may include an artifact opening that may extend through the frame. In such arrangements, the case further may include a marking artifact attached to the frame and protruding through the frame through the artifact opening to expose portions of the marking artifact.

In some arrangements, the frame may include an artifact recess. In such arrangements, the marking artifact may be received in the artifact recess and the elastomeric shell may overlie the marking artifact.

In some arrangements, the marking artifact may be ultrasonically welded to the frame.

In some arrangements, the case may further include a camera insert. In such arrangements, the camera insert may extend through the frame and the elastomeric shell and may define a camera opening configured for exposing a camera of the mobile device when the mobile device is received within the case. In some such arrangements, the camera insert may include an insert soft layer covering an insert rigid layer. In some such arrangements, the insert soft layer may be in contact with the insert rigid layer.

In some arrangements, the insert soft layer may be overmolded onto the insert rigid layer.

In some arrangements, the frame may include a frame base and frame sides extending from the frame base. In such arrangements, the elastomeric shell may include a shell base and shell sides extending from the shell base. In such arrangements, the shell base may be configured for covering at least a majority of the frame base when the elastomeric shell is received in the frame recess. In such arrangements, the shell sides may extend along at least a portion of the respective ones of the frame sides when the elastomeric shell is received in the frame recess.

In some arrangements, the elastomeric shell may define a button cover that may be configured for covering a button of a mobile device when the mobile device is received in the case. In such arrangements, the case may further include a rigid button cap that may cover the button cover and that may extend through the frame.

In some arrangements, the button cap may be made of plastic. In some such arrangements, the button cap may be thermoformed.

In some arrangements, the button cap may be translucent, transparent, or clear. In some such arrangements, the button cap may include a print visible to the naked eye through the button cap.

In some arrangements, the button cap may be made of metal.

In accordance with another aspect, a case for removably receiving a separate and distinct mobile device may include a frame and an elastomeric shell. The mobile device may have a front device surface, a rear device surface opposite the front device surface, and a periphery extending between the front device surface and the rear device surface. The frame may define a frame inner perimeter and may be configured for surrounding the periphery of the mobile device when the mobile device is received within the case. The frame may further define a frame recess. The elastomeric shell may be received in or may be configured for receipt in the frame recess and may be surrounded by or configured to be surrounded by the frame inner perimeter. The elastomeric shell further may have a shell outer surface, a shell inner surface opposite the shell outer surface, and a shell rim extending between the shell outer surface and the shell inner surface. The shell inner surface may define a pocket that may be configured for receiving the mobile device. The shell inner surface may form inner projections. Each of the inner projections may have an inner extremity that may extend toward an inside of the elastomeric shell and may be configured for contact with the mobile device when the mobile device is arranged in the shell inner surface. The shell outer surface may form outer projections and may form outer troughs. The outer projections may define respective outer projection extremities. Respective ones of the outer troughs may extend between the outer projections and may define outer trough extremities. The outer projections may extend toward the frame inner perimeter such that each of the outer trough extremities is spaced further from the frame than adjacent ones of the outer projection extremities. In some such arrangements, the outer projections may contact the frame.

In some arrangements, a tangential plane tangential to at least three of the outer projection extremities may define spaced-apart and collinear segments. The frame may include a frame inner surface having a frame planar portion. At least a portion, preferably a majority, and in some such arrangements an entirety, of at least one of the segments defined by the outer projection extremities lies in abutment with the frame planar portion.

It is to be noted that the features of the above-described arrangements are not exclusive to each other, and that any one of such features and arrangements can be combined with one or more of the other features and arrangements to arrive at further aspects of the invention.

BRIEF DESCRIPTION OF THE DRAWINGS

A more complete appreciation of the subject matter of the present invention and various advantages thereof may be realized by reference to the following detailed description and the accompanying drawings, in which:

FIGS. 1A and 1B are front and rear perspective views, respectively, of a mobile device case in accordance with an embodiment;

DETAILED DESCRIPTION

Figure 1C:
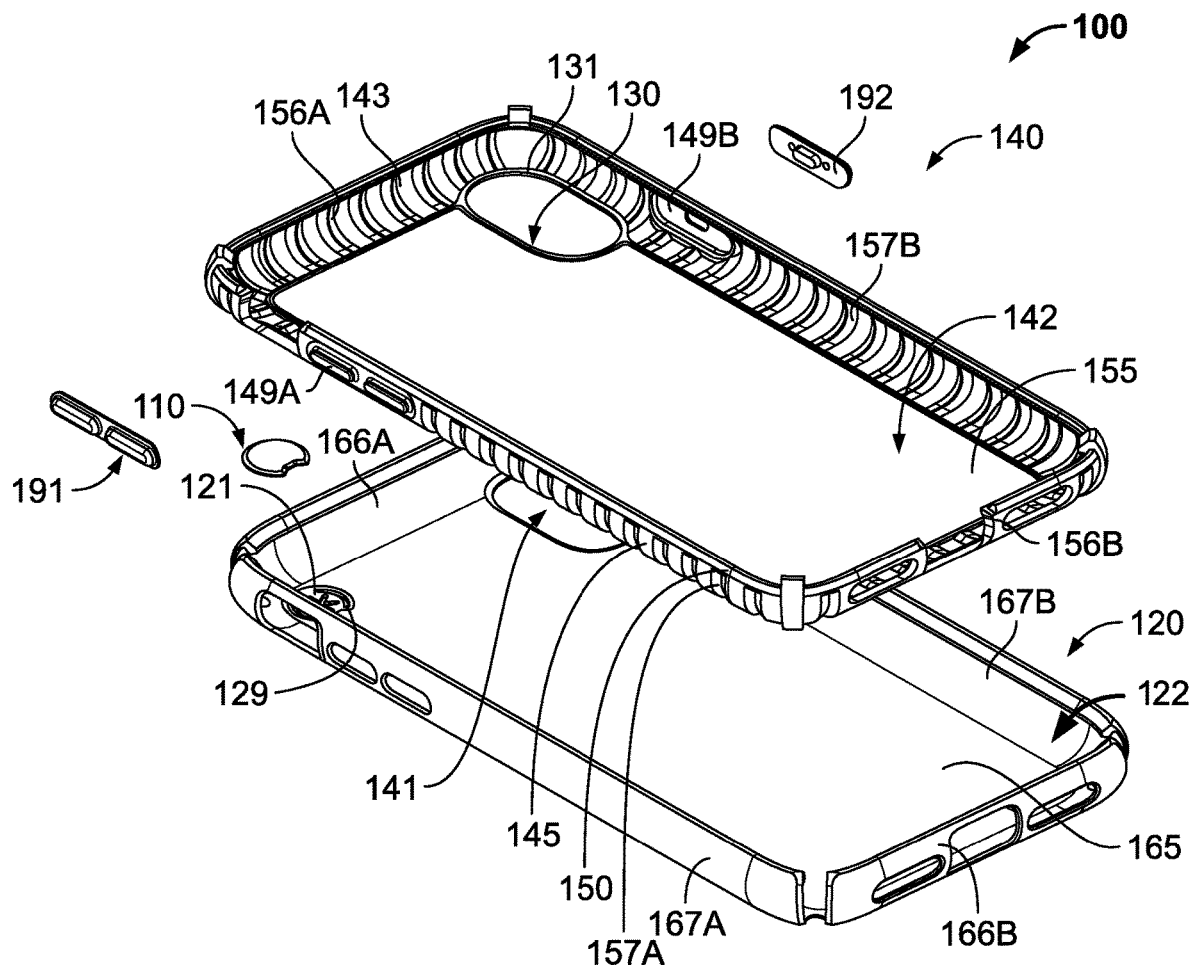
FIG. 1C is an exploded perspective view of the mobile device case of FIGS. 1A and 1B.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

As used herein, "mobile device" refers to a mobile phone device, an electronic tablet device, a laptop computer, or other mobile computing system and like.

Referring now to the example of FIGS. 1-4, case 100 is a case for securing and protecting a mobile phone device (not shown). Case 100 includes frame 120, elastomeric shell 140, camera insert 130, marking artifact 110, first button cap 191 which as in the example shown may be but is not limited to being configured for covering a volume button of a mobile phone, and second button cap 192 which as in the example shown may be but is not limited to being configured for covering a power button of a mobile phone.

Frame 120 includes frame base 165 as well as frame upper side 166A, frame lower side 166B, frame left side 167A, and frame right side 167B all extending from the frame base so as to define frame inner surface 122 forming a recess configured for receiving elastomeric shell 140 and in which to arrange a mobile device. Elastomeric shell 140 includes shell base 155 as well as shell upper side 156A, shell lower side 156B, shell left side 157A, and shell right side 157B all extending from the shell base so as to define shell inner surface 142 forming a pocket configured for receiving and retaining a mobile device.

Frame 120 preferably may be made of a rigid or hard material to create a rigid/hard shell which provides at least some impact protection as well as protection from being punctured by impacts with sharp objects. Preferred hard/rigid materials include hardened plastic material, a rigid or semi-rigid plastic material, a rigid/hard rubber material, a polycarbonate material, a metal, an alloy, a para-aramid material, wood, glass, mirror, quartz, and any combination thereof, and may be any color or texture. Elastomeric shell 140 preferably may be made of elastomeric or other suitably flexible materials. Preferred materials include thermosetting plastics having a hardness of shore 5D to shore 100D, polycarbonate, poly(methyl methacrylate) ("PMMA"), metals, acrylonitrile butadiene styrene ("ABS"), PMMA, polyethylene terephthalate ("PET"), high durometer thermoplastic elastomers ("TPEs") and thermoplastic polyurethanes ("TPUs") having a hardness of shore 30D to shore 100D, and any combination thereof. In some arrangements, elastomeric shell 140 may be made of a non-Newtonian dilatant material, as further described in U.S. Patent Application Publication Nos. 2019/0075899 A1 and 2019/0075900 A1, the entireties of which are hereby incorporated herein by reference.

Figure 2A:
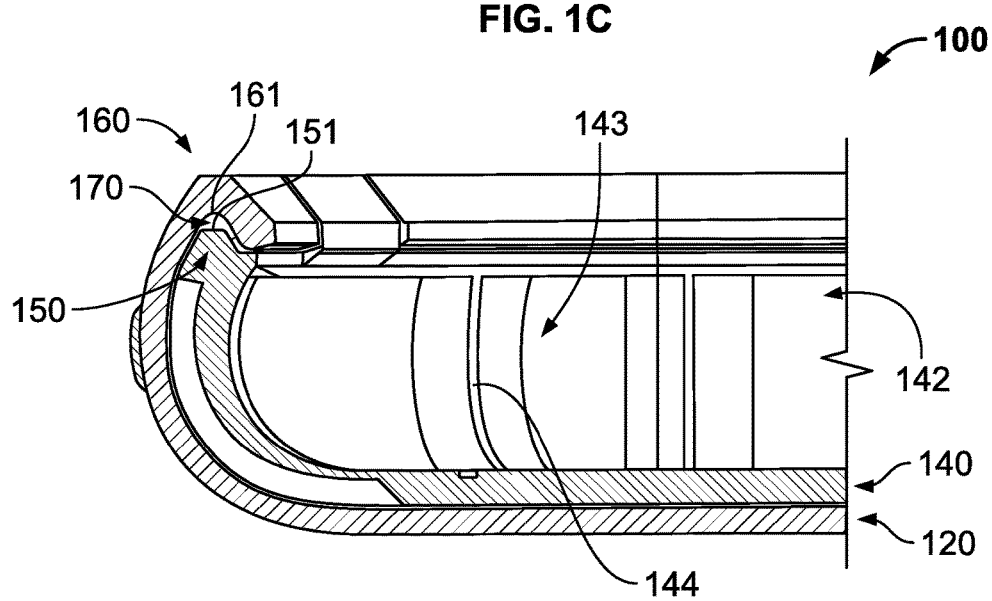
FIG. 2A is a cross-sectional elevation view of a portion of the mobile device case of FIGS. 1A and 1B along lines 2A-2A.

As best shown in FIG. 2A, elastomeric shell 140 is inserted within frame 120 and has an outer surface having portions that conform to frame inner surface 122. Frame right side 167B as shown along with sides 166A, 166B, 167A of frame 120 define frame bezel 160 that extends over shell rim 150 defined by shell right side 157B as shown along with sides 156A, 156B, 157A of elastomeric shell 140. Shell rim 150 has a shape that corresponds to frame bezel 160 with the exception that top portion 151 of shell rim 150 is truncated such that the top portion is spaced from top portion 161 of frame inner surface 122 to define adhesive channel 170. As demonstrated by FIG. 2B, adhesive channel 170 may extend along each of sides 156A, 156B, 157A, 157B of elastomeric shell 140. In this manner, adhesive channel 170 controls the flow of adhesive between frame 120 and elastomeric shell 140 ensuring an even and complete bond between the frame and the elastomeric shell along the adhesive channel.

By providing for a sufficient bond through the use of an adhesive, frame 120 and elastomeric shell 140 may be separately formed and later bonded without the need for overmolding of the elastomeric shell onto the frame to attach the two layers together. In this manner, materials that are incompatible for overmolding may be attached together. If desired, however, an overmolding process may be utilized in conjunction with an adhesive to provide for an even stronger bond between frame 120 and elastomeric shell 140.

Still referring to the example shown in FIG. 2A, shell right side 157B as shown as well as sides 156A, 156B, 157A of elastomeric shell 140 may be thinner along each side at the position of lower portion 152 of the sides of the elastomeric shell than at positions closer to shell rim 150. As demonstrated in FIG. 3, shell inner surface 142 forms inner projections 143 along each of sides 156A, 156B, 157A, 157B in which each of the inner projections includes inner extremity 144 extending toward an inside of elastomeric shell 140 and defining an apex of the respective inner projection. Each of inner extremities 144 may be configured for contacting a mobile device when the mobile device is arranged in shell inner surface 142. In the example shown, inner extremities 144 are in the form of triangular ridges that act as a shock barrier and dissipate impact forces. In this form, inner extremities 144 deform when force is applied between a mobile device received in elastomeric shell 140 and frame 120. The triangular shaped ridges deform in a different manner than semicircular or rectilinear protrusions, which may provide improved absorption of energy and less communication of forces to the device due to impact than protrusions of other shapes. In particular, as triangular ridges compress and deform between a received mobile device and elastomeric shell 140 upon impact, the surface area of inner extremities 144 when in the form of triangular ridges gradually increases.

Figure 2B:
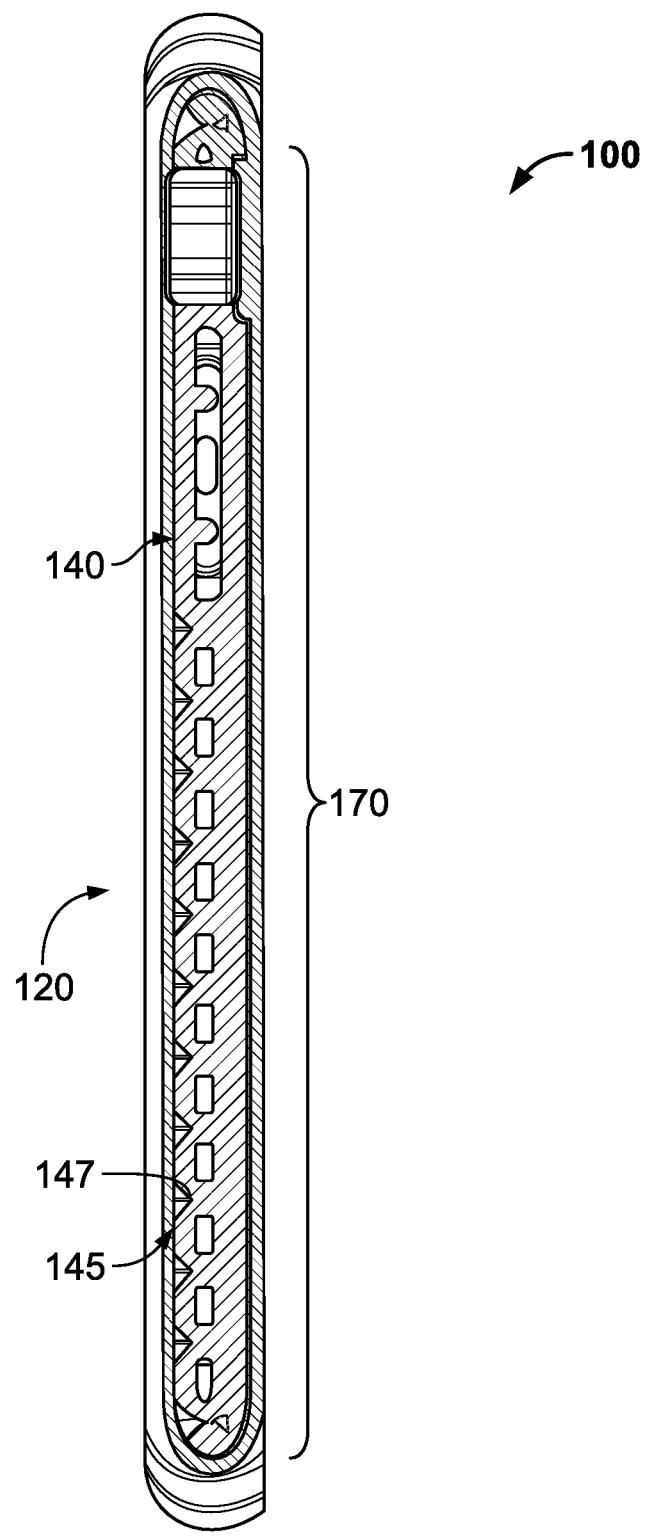
FIG. 2B is a cross-sectional elevation view of the mobile device case of FIGS. 1A and 1B along lines 2B-2B.
Figure 3:
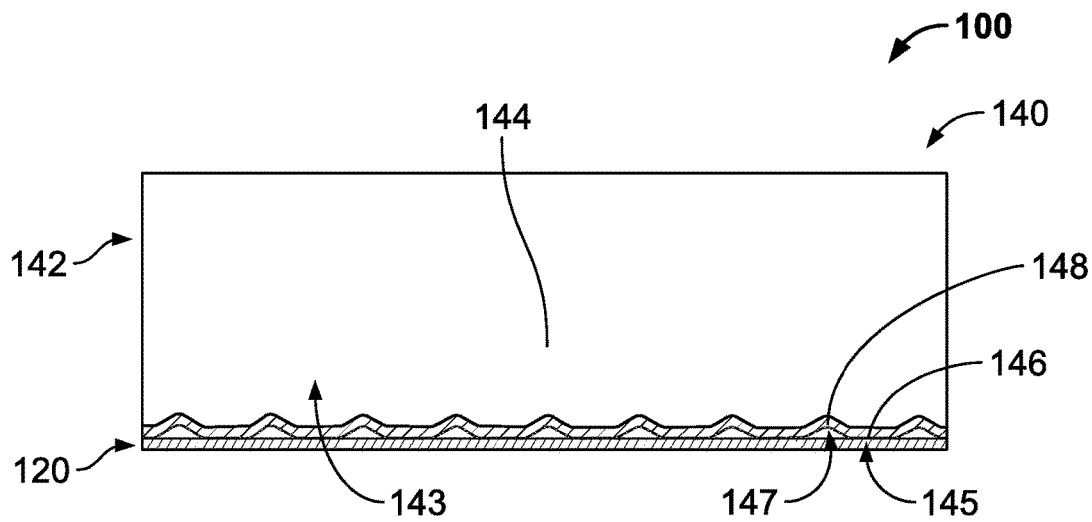
FIG. 3 is a cross-sectional plan view of a portion of a side and a portion of a base of the mobile device case of FIGS. 1A and 1B.

As further demonstrated in FIGS. 2B an 3, shell outer surface 141 forms outer projections 145 along each of sides 156A, 156B, 157A, 157B of elastomeric shell 140 in which each of the outer projections includes outer projection extremity 146. Shell outer surface 141 further forms outer troughs 147 extending between outer projections 145 along each of sides 156A, 156B, 157A, 157B in which each of the outer troughs include outer trough extremity 148 spaced further from frame 120 than adjacent ones of outer projection extremities 146 to define air gaps between each of the outer projections. As shown, each outer projection extremity 146 extends to at least tangentially contact frame 120, and in the example shown along collinear segments defined by respective planes tangential to the outer projection extremities along each of the four sides of shell outer surface 141. In this manner, a thickness of each of sides 156A, 156B, 157A, 157B begin to compress at the moment a mobile device received in the elastomeric shell moves in the direction of a respective one or more of the sides to provide shock absorption for the mobile device. As in the example shown, outer troughs 147 and thus the defined air gaps between each of outer projections 145 may be located opposite inner projections 143.

Figure 4:
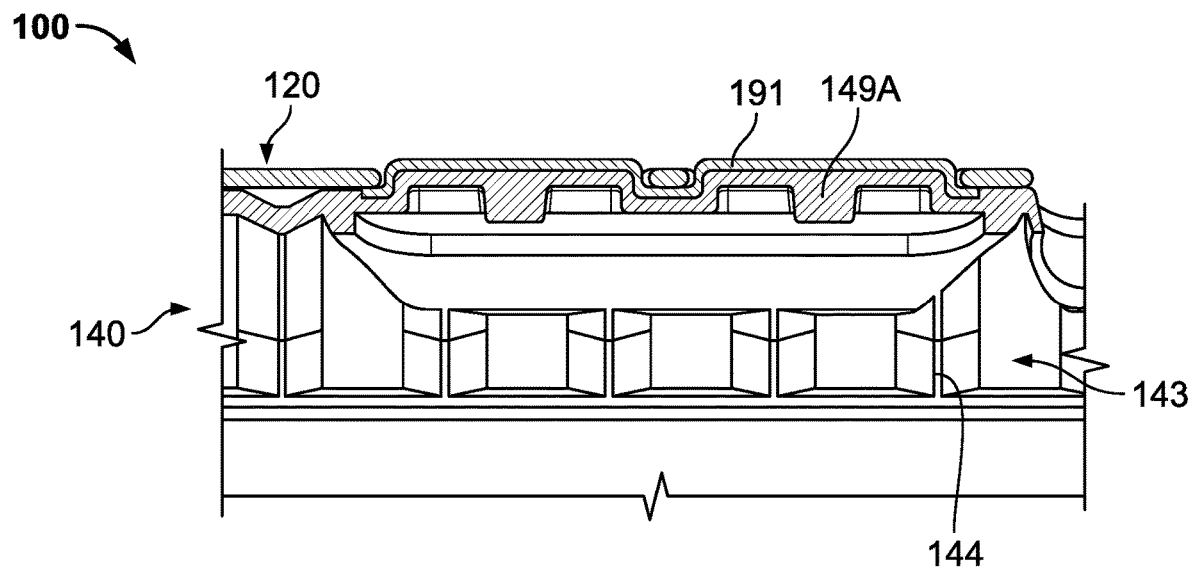
FIG. 4 is a cross-sectional plan view of a portion of the mobile device case of FIGS. 1A and 1B.

Referring now to FIGS. 1C and 4, elastomeric shell 140 is contoured to form first button cover 149A which as in the example shown may be but is not limited to being configured for covering a volume button, e.g., a toggle switch, of a mobile phone, and second button cover 149B which as in the example shown may be but is not limited to being configured for covering a power button of a mobile phone. As demonstrated by volume button cap 191 in FIG. 4, button caps 191, 192 optionally may be exposed for contact with a user of case 100 (and likewise a user of a case assembly including a mobile device when such mobile device is received in case 100) in which such caps may be used to cover first and second button covers 149A, 149B, respectively, such that the user does not contact either one of the first and the second button covers. In some arrangements, either one or both of button caps 191, 192 may be made of a rigid material such as but not limited to a metal, e.g., stainless steel, or thermoformed plastic, e.g. thermoformed polycarbonate. As further demonstrated by volume button cap 191 in FIG. 4, button caps 191, 192 are held in place between frame 120 and elastomeric shell 140 by way of a tight fit between the frame and the elastomeric shell, or in some arrangements, a slight compression of the elastomeric shell. In some arrangements, either one or both of button caps 191, 192 may be translucent, transparent, or clear. In such arrangements, a film or print, e.g., an ink coloring, a graphic, or an etching, may be provided between each such button cap 191, 192 and respective button cover 149A, 149B such that the film or print is partially or wholly visible to the naked eye through each such button cap.

With reference to FIGS. 1A-1C, camera insert 130 extends through frame 120 and elastomeric shell 140 and defines a camera opening configured for exposing a camera of the mobile device when the mobile device is received within the case. In the example shown, camera insert 130 includes an insert rigid layer and insert soft layer 131 covering the insert rigid layer. The insert rigid layer may be in the form of the flash insert for a mobile device disclosed in U.S. Pat. No. 9,720,442, the entirety of the disclosure of which is hereby incorporated by reference herein. The insert soft layer 131 may be overmolded onto the insert rigid layer.

Figure 5B:
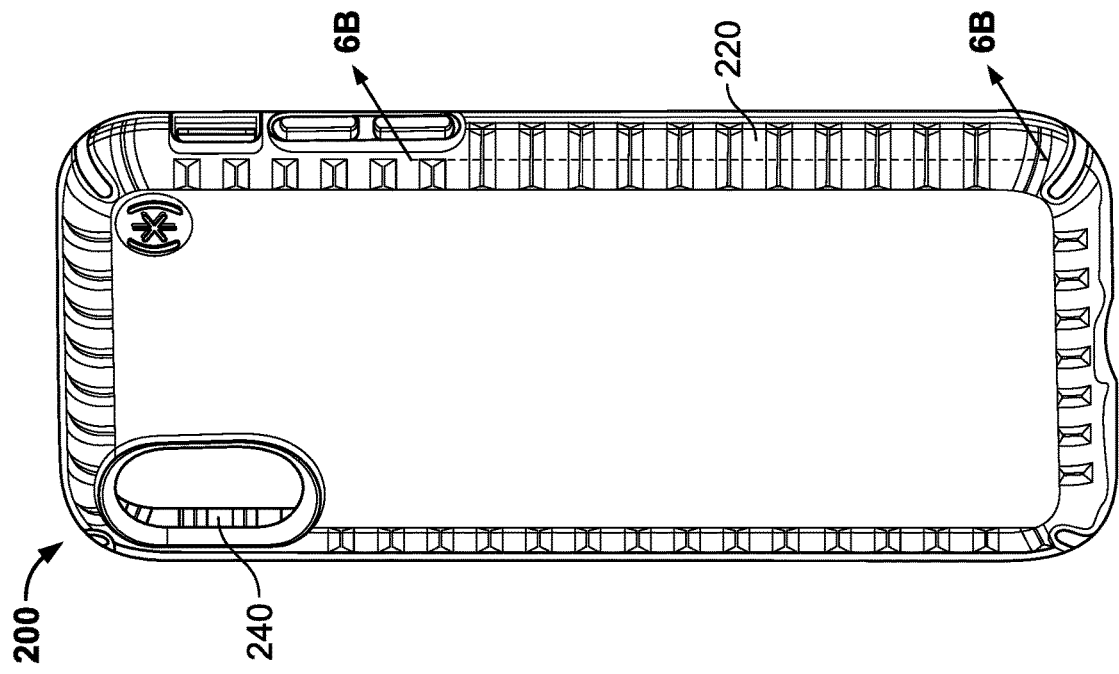
FIGS. 5A and 5B are front and rear perspective views, respectively, of a mobile device case in accordance with another embodiment.
Figure 5A:
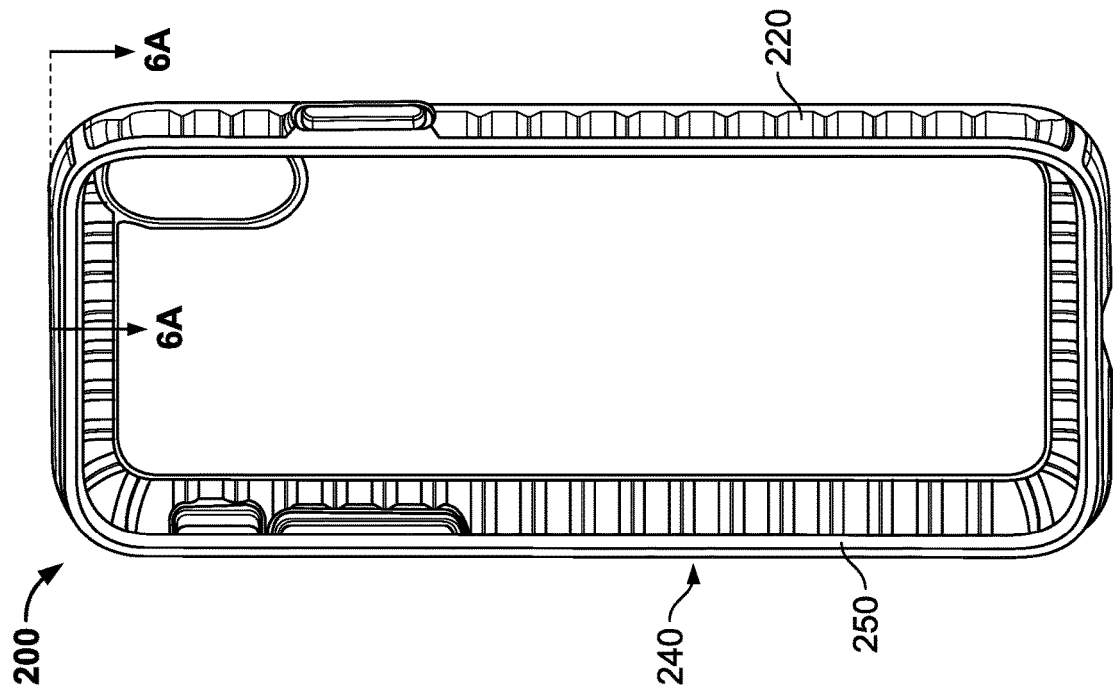
Figure 5C:
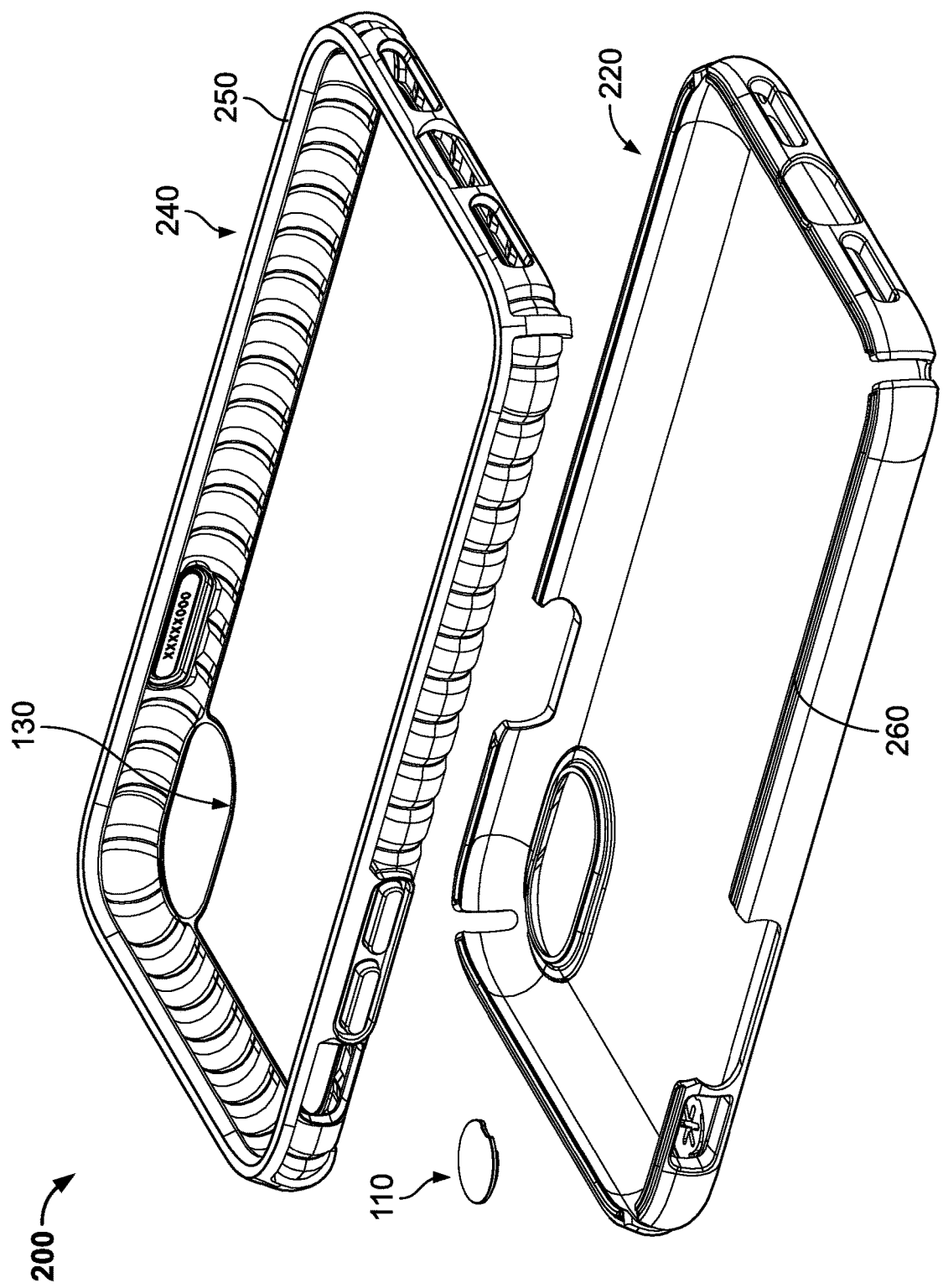
FIG. 5C is an exploded perspective view of the mobile device case of FIGS. 5A and 5B.

Still referring to FIGS. 1A-1C, in preparing case 100, marking artifact 110 may be ultrasonically welded to frame 120. As shown in FIG. 1C, prior to such welding, frame 120 includes artifact openings 129 extending through the frame. Artifact openings 129 are shown as extending through an upper left corner of frame base 165, although in other arrangements, the openings may be a single opening and may extend through different locations of frame 120. Prior to the ultrasonic welding, marking artifact 110 may be placed against frame 120 such that a rear side of the marking artifact protrudes through artifact openings 129, exposing the marking artifact. Through the ultrasonic welding, a permanent joint is formed between marking artifact 110 and frame 120. Elastomeric shell 140 is placed over marking artifact 110 such that a front side of the marking artifact is covered by the elastomeric shell. As further shown, frame base 165 may include recess 121 such that marking artifact 110 is received in the recess prior to the ultrasonic welding. In this manner, marking artifact 110 may be flush with the front side of frame base 165 allowing elastomeric shell 140 to overlie the frame base and marking artifact without interruption. In some arrangements (see, e.g., the example of FIGS. 5A-5C), either one or both of frame 120 and elastomeric shell 140 may be translucent, transparent, or clear such that an entirety of a facing side of marking artifact 110, may be visible through the one or both of the frame and the elastomeric shell.

Figure 6A:
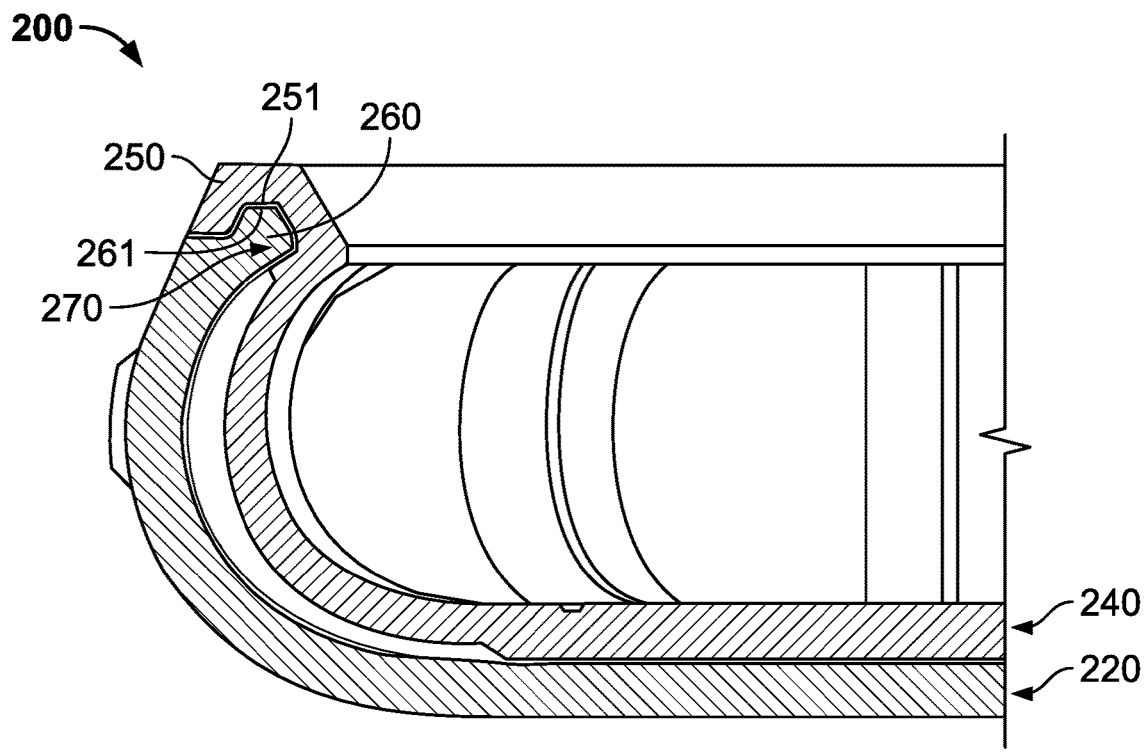
FIG. 6A is a cross-sectional elevation view of the mobile device case of FIGS. 5A and 5B along lines 6A-6A.
Figure 6B:
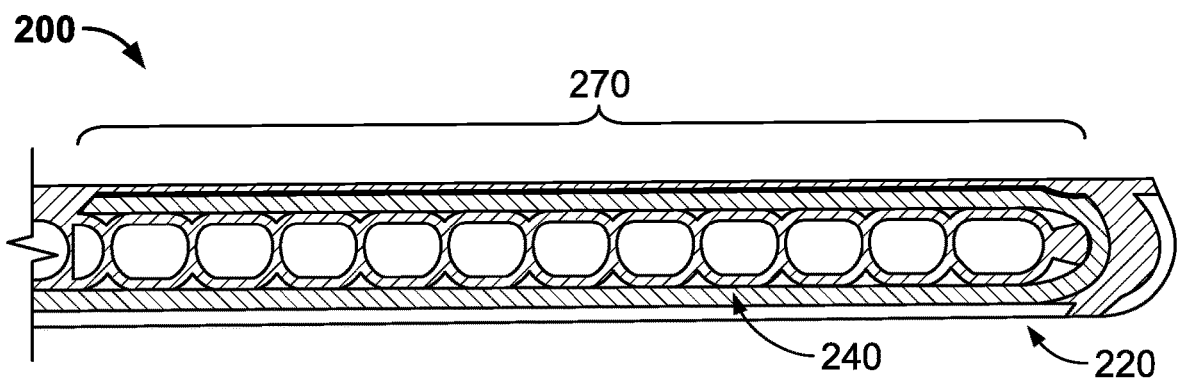
FIG. 6B is a cross-sectional elevation view of the mobile device case of FIGS. 5A and 5B along lines 6B-6B.
Figure 7B:
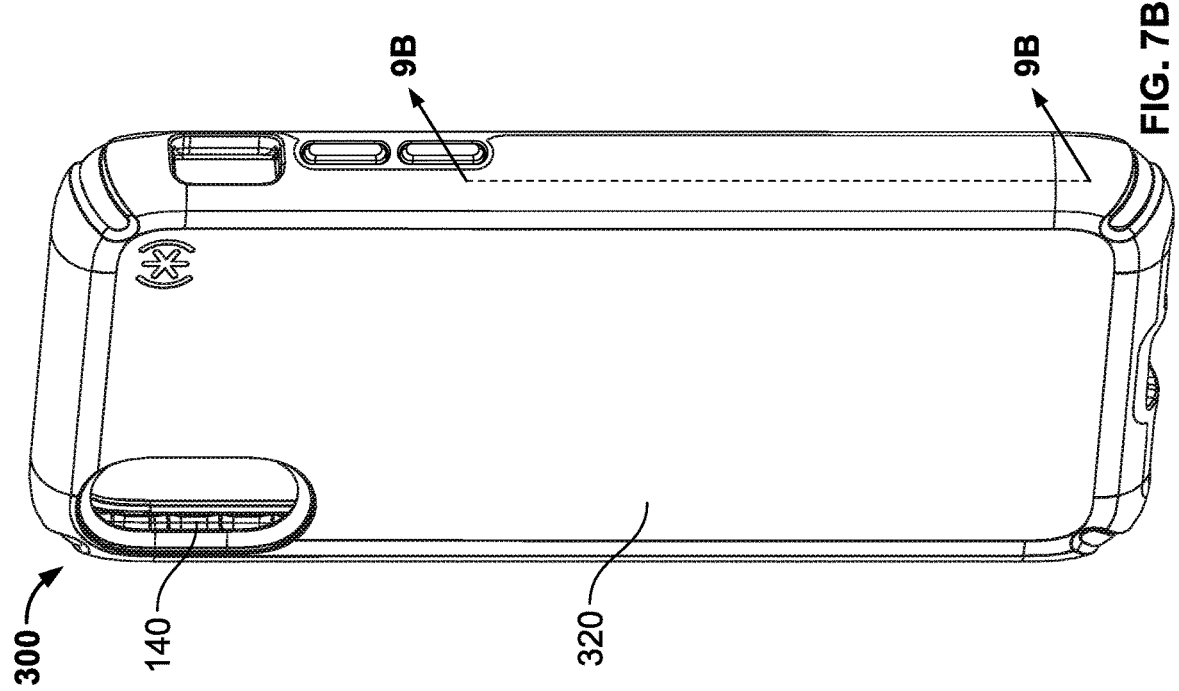
FIGS. 7A and 7B are front and rear perspective views, respectively, of a mobile device case in accordance with an embodiment.
Figure 7A:
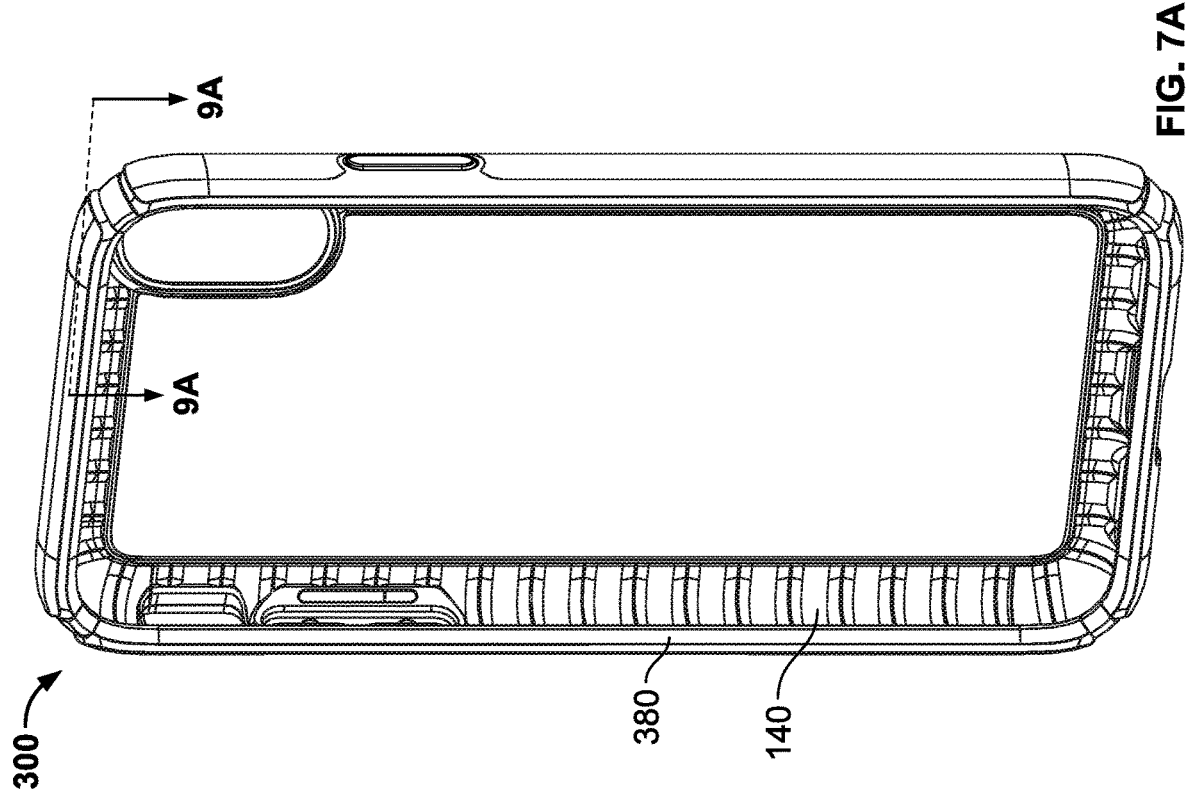
Figure 7C:
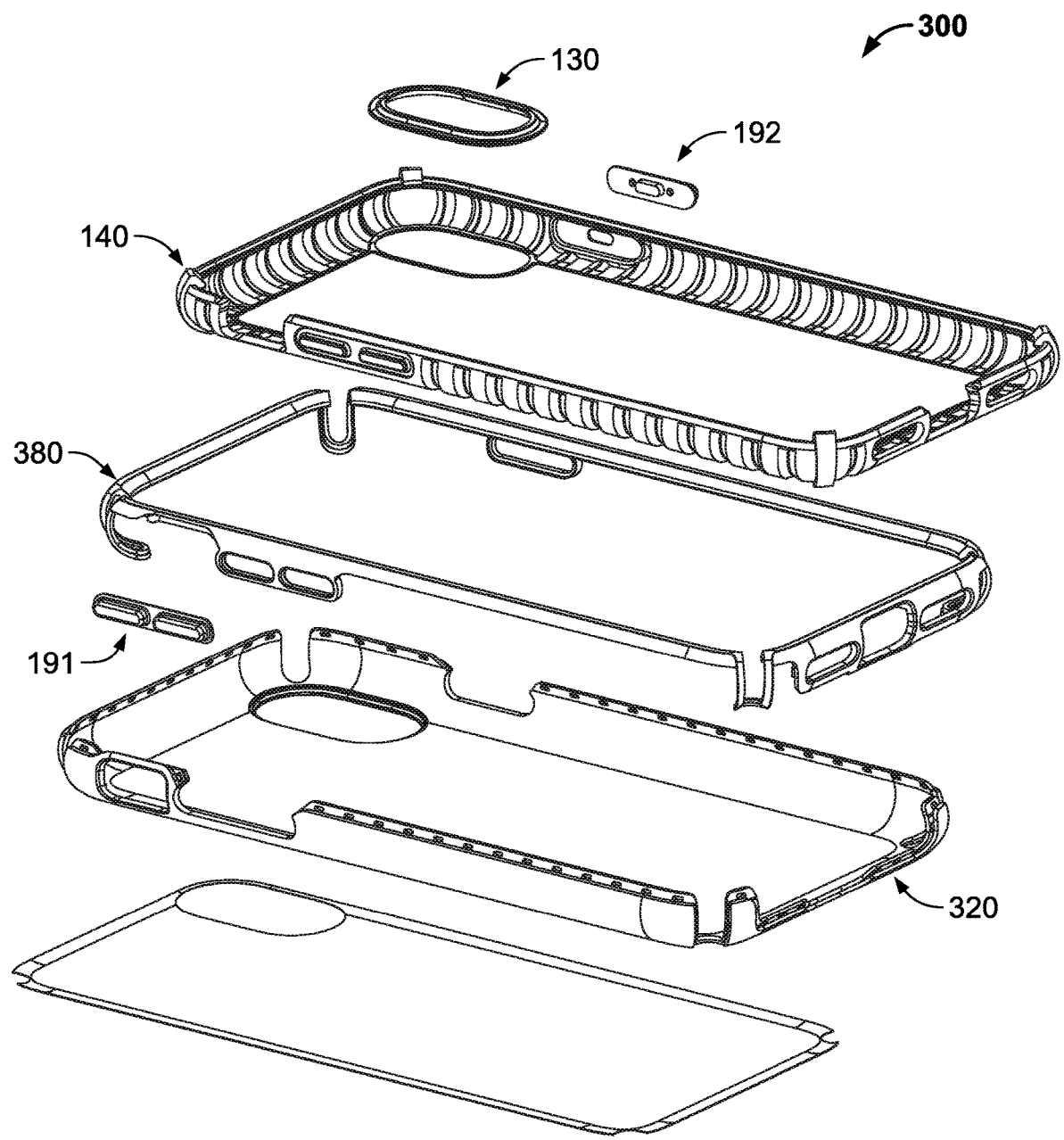
FIG. 7C is an exploded perspective view of the mobile device case of FIGS. 7A and 7B.
Figure 8A:
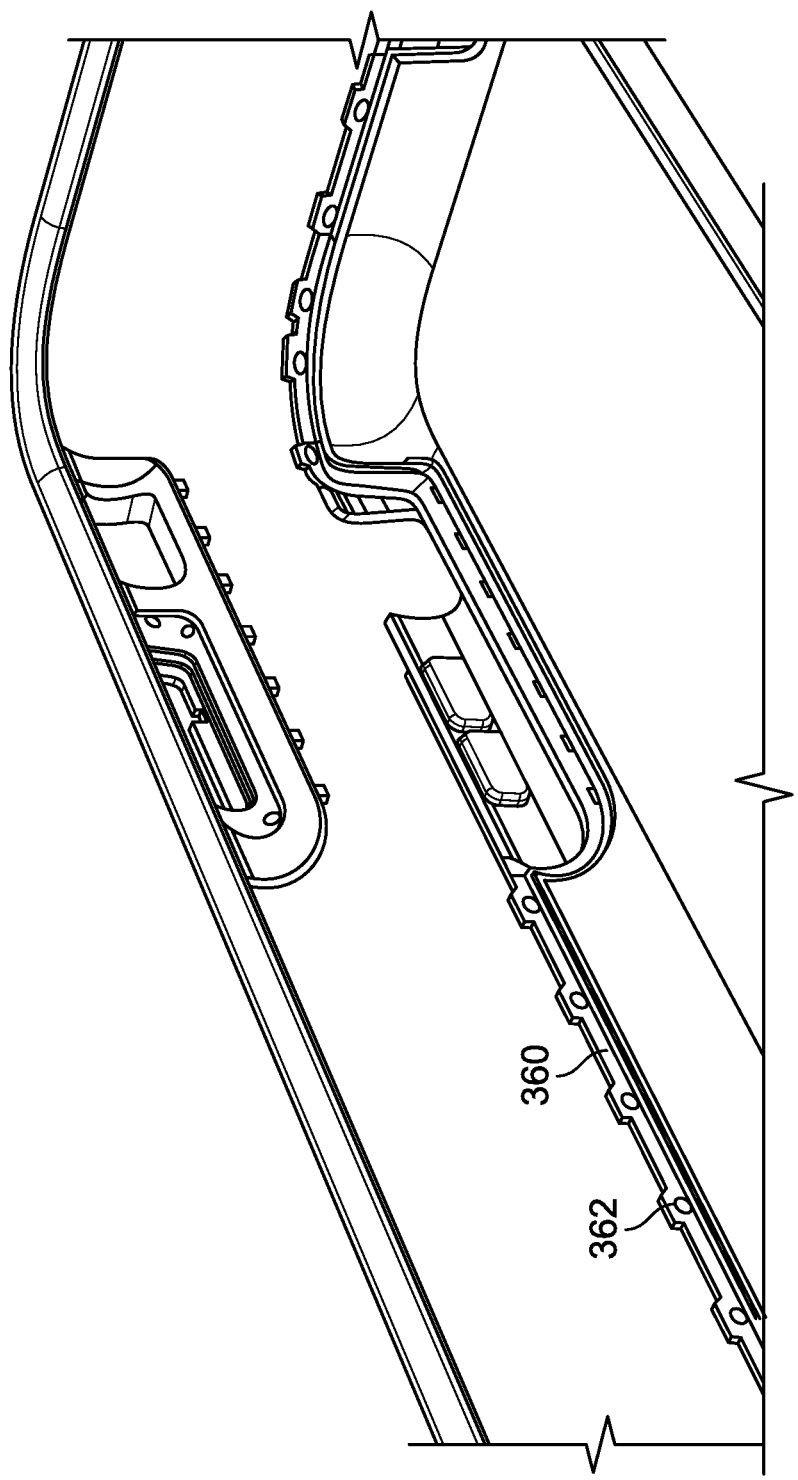
FIG. 8A is an exploded perspective view of portions of a frame and an elastomeric bezel of the mobile device case of FIGS. 7A and 7B.
Figure 8B:
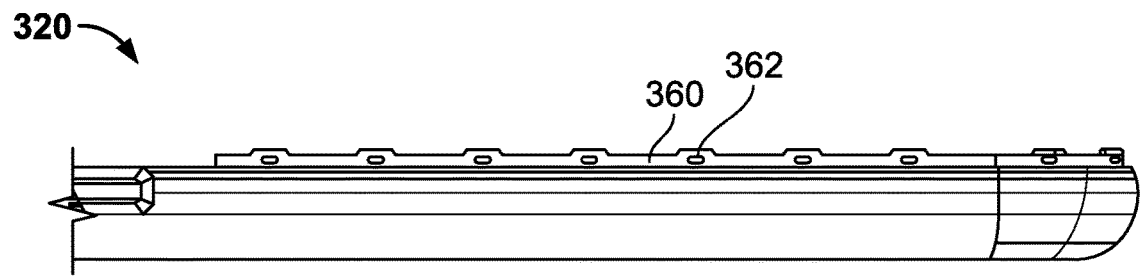
FIG. 8B is a side elevation view of a portion of the frame of FIGS. 7A and 7B.

Referring now to the example of FIGS. 5A-6B, case 200 is the same as or substantially the same as case 100 with the notable exception that case 200 includes frame 220 in place of frame 120 and elastomeric shell 240 in place of elastomeric shell 140 and further excludes button caps 191, 192. Frame 220 is the same as or substantially the same as frame 120 with the notable exception that frame 220 includes frame rim 260 in place of frame bezel 160. Elastomeric shell 240 is the same as or substantially the same as elastomeric shell 140 with the notable exception that elastomeric shell 240 includes shell bezel 250 in place of shell rim 150. As shown in FIG. 6A, shell bezel 160 extends over frame rim 260 to form an entirety of a rim of case 200. In the same manner as air gaps are formed between frame 120 and elastomeric shell 140 of case 100, air gaps are formed between frame 220 and elastomeric shell 240 at outer troughs located along the elastomeric shell. As shown in FIGS. 6A and 6B, frame rim 260 includes frame rim surface 261 and shell bezel 250 includes shell undercut surface 251 in which the frame rim surface and the shell undercut surface are spaced apart to define adhesive channel 270. As with adhesive channel 170 of case 100, adhesive channel 270 controls the flow of adhesive between frame 220 and elastomeric shell 240 ensuring an even and complete bond between the frame and the elastomeric shell along the adhesive channel. By providing for a sufficient bond through the use of an adhesive, frame 220 and elastomeric shell 240 may be separately formed and later bonded without the need for overmolding of the elastomeric shell onto the frame to attach the two layers together. In this manner, materials that are incompatible for overmolding may be attached together. If desired, however, an overmolding process may be utilized in conjunction with an adhesive to provide for an even stronger bond between frame 220 and elastomeric shell 240.

With reference now to FIGS. 7A-10, in an alternative arrangement, case 300 is the same as or substantially the same as case 100 with the notable exception that case 300 includes frame 320 in place of frame 120 and further includes elastomeric bezel 380. The use of first button cap 191 and second button cap 192, as shown with respect to case 300, is optional Frame 320 is the same as or substantially the same as frame 120 with the notable exception that frame 320 includes frame rim 360 in place of frame bezel 160. As best shown in FIGS. 8A and 8B, frame rim 360 extends to a lower height relative to elastomeric shell 140 than frame bezel 160 of case 100. Frame 320 includes a plurality of frame holes 362 adjacent to frame rim 360. In this manner, portions of elastomeric bezel 380 extend through each of the plurality of frame holes 362 to form a "stitched bezel" such that the elastomeric bezel 380 extends from frame rim 360 upward away from frame base 365. In some arrangements, elastomeric bezel 380 may be formed via overmolding onto frame 320.

Figure 9A:
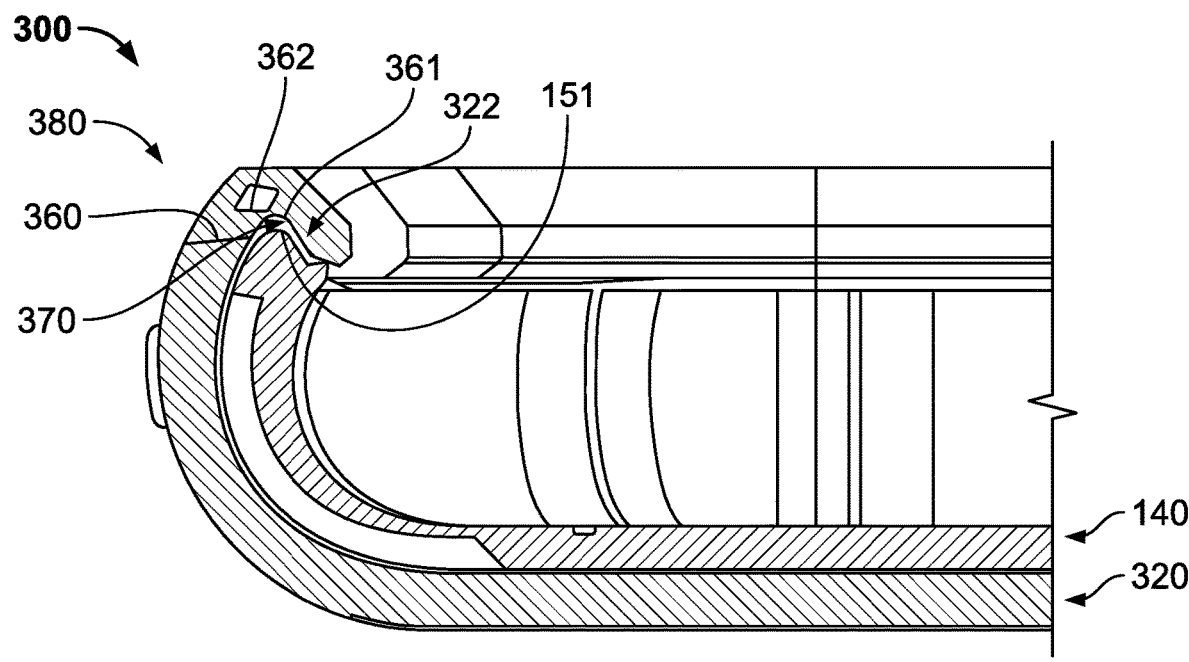
FIG. 9A is a cross-sectional elevation view of the mobile device case of FIGS. 7A and 7B along lines 9A-9A.
Figure 9B:
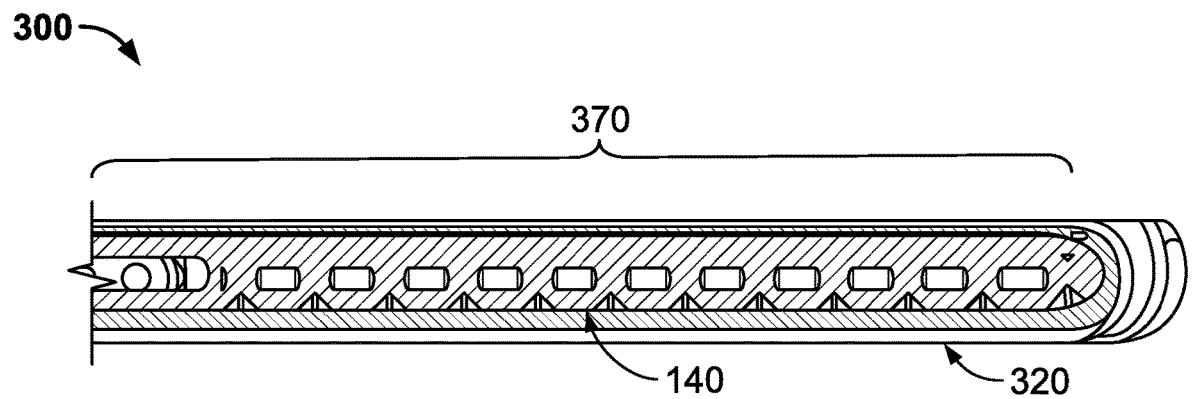
FIG. 9B is a cross-sectional elevation view of the mobile device case of FIGS. 7A and 7B along lines 9B-9B.
Figure 10:
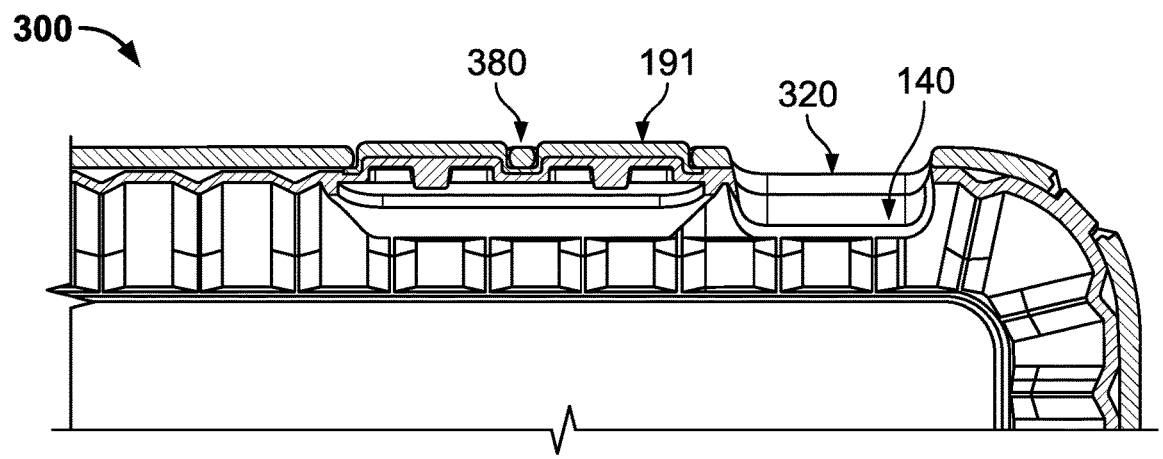
FIG. 10 is a cross-sectional plan view of a corner of the mobile device case of FIGS. 7A and 7B.

As shown in FIG. 9A, elastomeric bezel 380 extends over elastomeric shell 140 in the same manner that frame 120 of case 100 extends over elastomeric shell 140. Shell rim 150 of elastomeric shell 140 has a shape that corresponds to elastomeric bezel 380 with the exception that top portion 151 of shell rim 150 is truncated such that the top portion is spaced from top portion 361 of bezel inner surface 322 to define adhesive channel 370. As demonstrated by FIG. 9B, adhesive channel 370 may extend along each of sides 156A, 156B, 157A, 157B of elastomeric shell 140. In this manner, adhesive channel 370 controls the flow of adhesive between elastomeric bezel 380 and elastomeric shell 140 ensuring an even and complete bond between the bezel and the shell along the adhesive channel. By providing for a sufficient bond through the use of an adhesive, frame 320 and elastomeric shell 140 may be separately formed and later bonded via the adhesive in adhesive channel 370 between elastomeric bezel 380 and elastomeric shell 140 and attachment via the stitched bezel of the frame and the elastomeric bezel without the need for overmolding of the elastomeric shell onto the frame to attach the elastomeric shell to the frame. In this manner, materials that are incompatible for overmolding may be attached together. If desired, however, an overmolding process may be utilized in conjunction with an adhesive to provide for an even stronger bond between frame 320 and elastomeric shell 140.

Elastomeric bezel 380 may be made of any one of the same materials of which elastomeric shell 140 may be made, including the materials discussed previously herein with respect to elastomeric shell 140. In some arrangements, elastomeric bezel 380 and elastomeric shell 140 of case 300 may be made of the same material.

In some arrangements, a soft touch coating may be applied to an exterior of any one of cases 100, 200, 300 to provide a feel desired by some consumers as well as scratch resistance. Such coating may be sprayed onto cases 100, 200, 300.

In some arrangements, any one or any combination of surfaces of frame 120, 220, 320, elastomeric shell 140, 240, 340, and elastomeric bezel 380 when utilized, exposed to users of cases 100, 200, 300 may be treated with an antimicrobial material applied as a coating or any one of such layers 120, 220, 320, 140, 240, 340, 380 may have an antimicrobial material embedded into such layers. Preferred antimicrobial materials include silver or silver alloy (e.g., silver sodium hydrogen zirconium phosphate), copper or copper alloy, organosilanes, quaternary ammonium compounds (e.g., dimethyloctadecyl (3-trimethoxysilyl propyl) ammonium chloride, alkyldimethylbenzylammonium chloride, and didecyldimethylammonium chloride), chlorhexidine, chlorhexidine incorporated hydroxyapatite materials, chlorhexidine-containing polymers (e.g., chlorhexidine-containing polylactide), and antibiotics (e.g., gentamicin, cephalothin, carbenicillin, amoxicillin, cefamandol, tobramycin, vancomycin). Preferred antimicrobial coatings include coatings containing any of the aforementioned antimicrobial materials, chlorhexidine-containingpolylactide coatings on an anodized surface, and polymer and calcium phosphate coatings with chlorhexidine. These antimicrobial treatments aid in reducing the presence and preventing the growth of microbes (e.g., bacteria, fungi, viruses, etc.), thereby aiding in preventing the spread of related sicknesses, illnesses, or diseases.

It is noted that the terminology used above is for the purpose of reference only, and is not intended to be limiting. For example, terms such as "upper," "lower," "above," "below," "rightward," "leftward," "clockwise," and "counterclockwise" refer to directions in the drawings to which reference is made. As another example, terms such as "inward" and "outward" may refer to directions toward and away from, respectively, the geometric center of the component described. As a further example, terms such as "front," "rear," "side," "left side," "right side," "top," "bottom," "inner," "outer," "horizontal," and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Indeed, the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally. Moreover, the disclosure set forth herein includes the mirror image, i.e., mirror configuration, taken from any perspective of any drawing or other configuration shown or described herein. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:

1. A case for removably receiving a separate and distinct mobile device having a front device surface, a rear device surface opposite the front device surface, and a periphery extending between the front device surface and the rear device surface of the mobile device, the case comprising:
 a frame comprising a planar frame base from which a plurality of curving frame sides extend upwardly and inwardly thereby defining a frame cavity; and
 an elastomeric shell comprising a elastomeric shell cavity defined by a planar shell base from which a plurality of adjacent shell sides extend upwardly and inwardly, wherein the plurality of adjacent shell sides comprise a shell inner surface and a shell outer surface, wherein the shell inner surface comprises a plurality of inner projections disposed at approximately even intervals, and the shell outer surface comprises a plurality of outer projections disposed at approximately even intervals, and a shell rim extending between the shell outer surface and the shell inner surface, wherein the elastomeric shell cavity is adapted to enclose the mobile device,
 wherein the frame cavity is adapted to enclose the shell cavity such that the frame base is in contact with the shell base and the outer projections contact the frame cavity;
 wherein the plurality of inner projections each comprise a deformable inner extremity in the shape of a parallel triangular ridge with the apex of each triangular ridge oriented toward the shell cavity such that the apex is adapted to contact the periphery of the mobile device;
 wherein the outer projections comprise an outer projection extremity extending away from the shell cavity and in contact with the frame sides;
 wherein the inner projections and outer projections alternate along a length of each shell side.

2. The case according to claim 1, wherein a thickness of the elastomeric shell along at least a portion of a cross-section of the elastomeric shell cavity that includes one of the outer projections is uniform.

3. The case according to claim 1, wherein the frame further comprises a frame rim, and wherein the elastomeric shell further comprises a shell bezel defining the shell rim, the shell bezel extending over at least a portion of the frame rim.

4. The case according to claim 3, wherein opposing portions of the frame rim and the shell bezel are spaced apart to define an adhesive channel, the case further comprising an adhesive extending along the adhesive channel and bonding the shell bezel to the frame rim.

5. The case according to claim 1, wherein the frame further comprises a frame rim, the case further comprising an elastomeric bezel extending from the frame rim and extending over at least a portion of the shell rim.

6. The case according to claim 5, wherein the frame further comprises a plurality of frame holes adjacent the frame rim, wherein portions of the elastomeric bezel extend through the plurality of frame holes.

7. The case according to claim 5, wherein opposing portions of the shell rim and the elastomeric bezel are spaced apart a greater distance than portions of the elastomeric shell adjacent to the shell rim are spaced from opposing portions of the elastomeric bezel to define an adhesive channel, the case further comprising an adhesive extending along the adhesive channel and bonding the elastomeric bezel to the shell rim.

8. The case according to claim 1, wherein a tangential plane tangential to at least three of the outer projections defines spaced-apart and collinear segments.

9. The case according to claim 8, wherein the frame further comprises a frame inner surface having a frame planar portion, and wherein at least a majority of at least one of the segments defined by the outer projection extremities lies in abutment with the frame planar portion.

10. The case according to claim 1, wherein either one or both of the frame and the elastomeric shell is translucent, transparent, or clear.

11. The case according to claim 1, wherein the frame base includes an artifact opening extending through the frame base, the case further comprising a marking artifact attached to the frame base and protruding through the frame base through the artifact opening to expose portions of the marking artifact.

12. The case according to claim 1, wherein the elastomeric shell defines a button cover configured for covering a button of a mobile device when the mobile device is received in the case, the case further comprising a rigid button cap covering the button cover and extending through the frame.

13. The case according to claim 12, wherein the button cap is translucent, transparent, or clear and includes a print visible to the naked eye through the button cap.

14. A case for removably receiving a separate and distinct mobile device having a front device surface, a rear device surface opposite the front device surface, and a periphery extending between the front device surface and the rear device surface of the mobile device, the case comprising:
 a frame comprising a frame inner perimeter, the frame inner perimeter defining a frame recess; and
 an elastomeric shell comprising:
 a shell base;
 shell walls having an interior surface and an exterior surface, the shell walls extending in a first direction from the shell base, the shell walls and the shell base thereby defining a cavity, the cavity adapted to contact the rear device surface and the periphery of the mobile device, each shell wall comprising a plurality of inner projections disposed at regular intervals along the length of each shell wall, and
 wherein each inner projection comprises a channel having a triangular cross section extending in the first direction, the channel having an apex that extends inwardly toward the cavity, such that the shell wall interior surface corresponding to the apex is adapted to contact the periphery of the mobile device;
 wherein a portion of the exterior surface of the shell wall corresponding to the inner projection, and contact between the exterior surface of the shell wall adjacent to each inner projection and the frame inner perimeter proximate to the shell wall adjacent to each inner projection define a prismatic void between each channel and the frame inner perimeter proximate to the channel.

15. A case for removably receiving a separate and distinct mobile device having a front device surface, a rear device surface opposite the front device surface, and a periphery extending between the front device surface and the rear device surface of the mobile device, the case comprising:

a frame, comprising:

a frame base characterized by a frame perimeter having a plurality of frame perimeter edges, the frame perimeter having a shape corresponding to the periphery of the mobile device;

a plurality of frame sides extending away from each frame perimeter edge in a first direction, such that the frame base and the plurality of frame sides define a frame cavity that conforms to the periphery and the rear device surface of the mobile device;

a shell comprised of an elastomeric material, further comprising:

a shell base characterized by a shell perimeter having one or more shell perimeter edges, the shell perimeter having a shape congruent with the frame perimeter;

a plurality of shell sides extending away from the shell perimeter edges in the first direction, such that the shell base and the plurality of shell sides define a shell cavity that is congruent with the frame cavity;

wherein each of the plurality of shell sides comprises an interior surface and an exterior surface, and a plurality of channels disposed at regular intervals along the length of each shell side, wherein each of the plurality of channels extends in the first direction, wherein each of the plurality of channels is triangular in cross section such that the apex of each channel is oriented inwardly towards the cavity such that the interior surface of the shell side corresponding to the apex is adapted to contact the periphery of the mobile device, wherein contact between the exterior surface of the shell side adjacent to each channel and the proximate frame side defines a prismatic void between the shell side and the proximate frame side.

* * * * *